US012428876B2

(12) United States Patent
Cato et al.

(10) Patent No.: US 12,428,876 B2
(45) Date of Patent: Sep. 30, 2025

(54) GRINDER RESISTANT LOCK

(71) Applicant: Altor Locks, LLC, Sterling, VA (US)

(72) Inventors: Dylan Cato, Sterling, VA (US); Karen Schaufeld, Leesburg, VA (US)

(73) Assignee: Altor Locks, LLC, Sterling, VA (US)

( * ) Notice: Subject to any disclaimer, the term of this patent is extended or adjusted under 35 U.S.C. 154(b) by 227 days.

(21) Appl. No.: 17/280,879

(22) PCT Filed: Sep. 13, 2019

(86) PCT No.: PCT/US2019/051051
§ 371 (c)(1),
(2) Date: Mar. 27, 2021

(87) PCT Pub. No.: WO2020/056289
PCT Pub. Date: Mar. 19, 2020

(65) Prior Publication Data
US 2022/0003019 A1 Jan. 6, 2022

Related U.S. Application Data

(60) Provisional application No. 62/731,265, filed on Sep. 14, 2018.

(51) Int. Cl.
*E05B 67/38* (2006.01)
*E05B 15/16* (2006.01)
*E05B 67/06* (2006.01)

(52) U.S. Cl.
CPC .......... *E05B 67/38* (2013.01); *E05B 15/1614* (2013.01); *E05B 67/063* (2013.01)

(58) Field of Classification Search
CPC ......... E05B 15/1614; E05B 2015/1628; E05B 67/06; E05B 67/063; E05B 67/22; E05B 67/38; E05B 67/383; E05B 2067/066
See application file for complete search history.

(56) References Cited

U.S. PATENT DOCUMENTS

| | | | | | |
|---|---|---|---|---|---|
| 3,844,019 | A * | 10/1974 | Shwayder | E05B 67/06 | 428/685 |
| 3,976,434 | A * | 8/1976 | Shwayder | E05B 67/06 | 428/609 |
| 4,561,272 | A * | 12/1985 | Goldstein | E05B 67/06 | 70/417 |
| 8,156,772 | B2 * | 4/2012 | Buhl | E05B 67/003 | 70/53 |
| 9,512,640 | B2 * | 12/2016 | Kyllonen | E05B 67/38 | |
| 10,378,246 | B2 * | 8/2019 | Perrenoud | E05B 67/063 | |
| 10,563,431 | B2 * | 2/2020 | Holmes | E05B 67/003 | |
| 11,111,699 | B2 * | 9/2021 | Perrenoud | E05B 67/06 | |
| 2011/0162416 | A1 * | 7/2011 | Becker | B62H 5/00 | 70/53 |
| 2023/0095874 | A1 * | 3/2023 | Banse | E05B 67/06 | 70/233 |
| 2024/0011332 | A1 * | 1/2024 | Kemper | E05B 67/063 | |

* cited by examiner

*Primary Examiner* — Christopher J Boswell

(57) ABSTRACT

U-shaped locks are provided with an external shell made from a relatively soft metal that clogs grindings disks and reduces their cutting effectiveness.

15 Claims, 3 Drawing Sheets

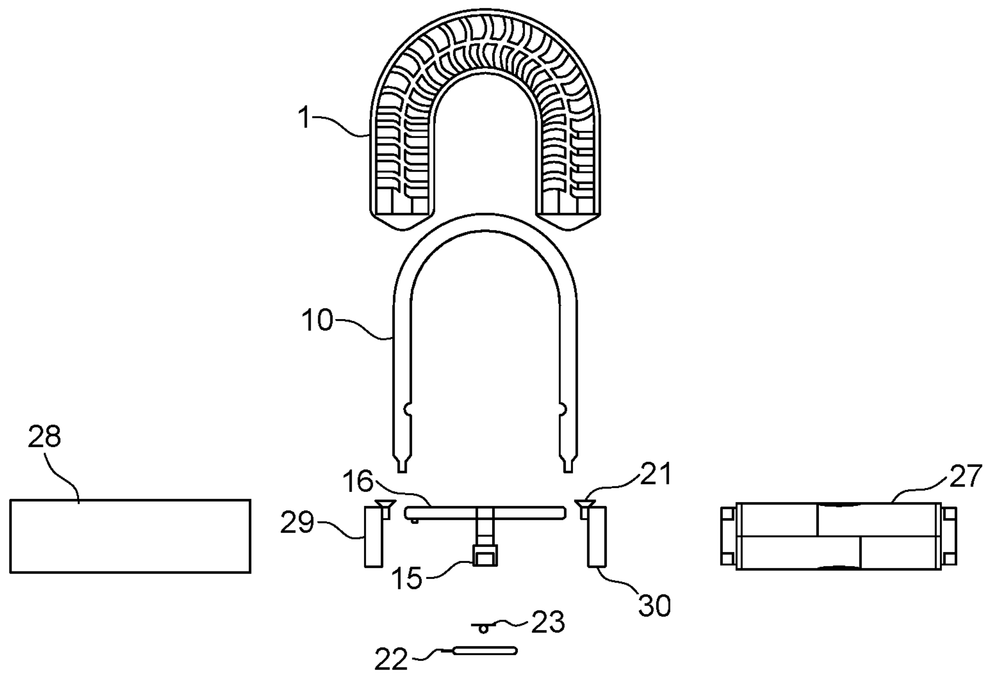
Figure 7
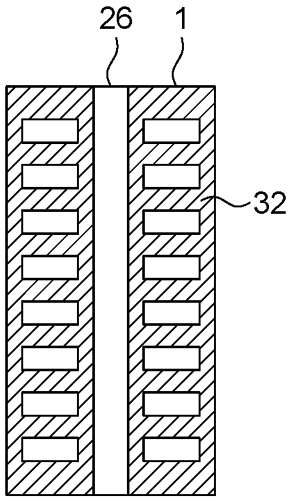
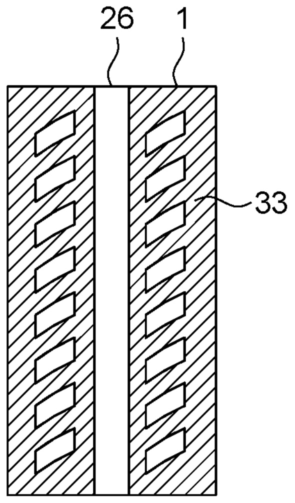
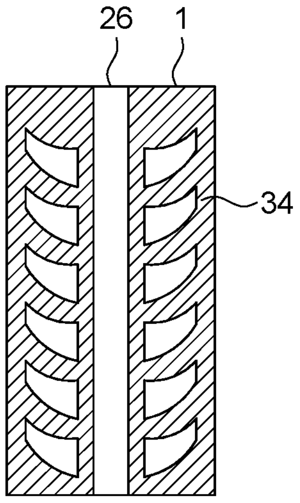
Figure 8 Figure 9 Figure 10

GRINDER RESISTANT LOCK

This application is related to provisional patent application Ser. No. 62/731,265 filed on Sep. 14, 2018 the disclosure of which is hereby incorporated by reference.

FIELD OF THE INVENTION

The invention relates to locks that are resistant to attacks by angle grinders and similar friction-based devices.

BACKGROUND OF THE INVENTION

A variety of locking devices are commercially available for one, two, and three-wheeled vehicles. One of the most popular is an elongated U-shaped bar that is sufficiently long and wide to secure at least one wheel, the frame, and a post or stand. The end of the U-shaped bar is closed with a straight, cross bar lock that engages both terminal ends of the shackle arms to form an elongated D-shaped lock. See U.S. Pat. Nos. 4,888,967; 5,010,746; 8,225,631; and US publication numbers 2005/0092038 and 2014/0109631, the disclosures of which are hereby incorporated by reference.

U-locks are a popular form of bike lock. They are strong, effective, and relatively compact. With the proper locking technique, they can be a strong deterrent to theft. The shackle is threaded through the wheel and around (or through) that frame and then around a stationary stand to secure the bike. Despite their strengths, the U-lock shackle can still be vulnerable to a concerted attack with a portable angle grinder and a coarse grit cutting wheel.

Grinding is the most common form of abrasive machining. It is a material cutting process which engages an abrasive tool whose cutting elements are grains of abrasive material known as grit. These grits are characterized by sharp cutting points, high hot hardness, chemical stability and wear resistance. The grits are held together by a suitable bonding material to give shape of an abrasive tool. These grits are characterized by sharp cutting points, high hot hardness, chemical stability and wear resistance.

While not wishing to be bound by theory, it is likely that the act of cutting by abrasive grinding includes elements of material removal by both brittle fracture and ductile flow. One paper suggests that large amounts of energy used in plastic deformation due to plowing. See Masoumi et at, "Grinding Force, Specific Energy and Material Removal Mechanism in Grinding of HVOF-Sprayed WC—Co—Cr Coating." *Materials and Manufacturing Processes,* 29(3) (2014) available on the internet at http://bit.ly/2ZZY0yO.

Another paper teaches that grinding grit are self-sharpening in that grit surfaces fractured during the grinding process present new, sharp, cutting surfaces that continue to remove material with efficiency. High grinding speed may increase the material removal rate but with an attendant increase in the grinding temperature at the interface between the grit and abraded surface. See Chen, "Effect of different parameters on grinding efficiency and its monitoring by acoustic emission", *Production & Manufacturing Research,* 4(1), pp. 190-208 (2016) available on the internet at http://bit.ly/2ZUI1Ca.

With the commercialization of higher voltage batteries and the introduction of portable angle grinders designed to use them, owners of two and three-wheeled vehicles have had a hard time protecting their vehicles from theft. In most locking configurations, some length of shackle remains exposed. Videos exist showing passersby watching a thief attack and cut through a lock shackle with a noisy angle grinder, sparks flying. Nonetheless, time remains the enemy of the thief. Long cutting times and potentially the need for multiple batteries all increase the odds of discovery by the owner or someone willing to interrupt the thief. Cutting fluids are rarely, if ever, used by a bike thief when attacking a lock with an angle grinder. The cuts are generally dry, hot, and fast.

Traditionally, U-locks have been made more secure by increasing the diameter of the hardened steel shackle. U-locks with diameters of less than 13 mm will be susceptible to attacks by medium sized bolt cutters. Better U-locks, with diameters of between 13 and 15 mm are unlikely to be defeated by anything but the biggest bolt cutters. At the top of the range there are the thickest locks, with diameters of 16 to 18 mm which cannot be cropped by even the biggest bolt cutters. Of course, even the thickest U-locks can be defeated by angle grinders.

So, the thicker your U-lock, the better is its security but at the cost of a heavier lock. Heavy locks are cumbersome to carry by the rider and have a definite impact on whether the rider is willing to use a heavy lock even if it offers greater security.

It would be desirable to have a U-lock that could resist an attack by a portable grinder.

It would be desirable to have a shackle protector for a U-lock that offered increased resistance to grinder attacks on the shackle.

It would also be desirable to have a replaceable shackle shell that could both protect the shackle and allow replacement after an unsuccessful attack or retrofit protection for an existing U-lock.

SUMMARY OF THE INVENTION

It is an object of the invention to provide a U-lock that is resistant to grinding attack.

It is also an object of the invention to provide a shackle protector that helps to protect the shackle of a U-lock by a shell material that is softer than the shackle steel and that acts to clog the cutting grit of a grinder.

In accordance with these and other objects of the invention that will become apparent from the description herein, a grinder resistant lock according to the invention includes: (a) a U-lock comprising (i) a U-shaped shackle made of a hardened metal and exhibiting first and second arms on either side of a centrally located curved portion and terminating in a slotted locking foot at the end of the first and second arms, and (ii) a lockable crossbar that releasably engages a terminal end on each of the shackle first and second arms; and (b) a shackle shell over substantially the entire length of the shackle above each locking foot and being made from a material that is softer than the shackle steel and is sufficiently thick in cross sectional area to clog a coarse grit cutting wheel when contacting said shell and thereby reducing the cutting efficiency of the grinder wheel.

The shackle shell of the present invention may also be sold apart from its combination with a U-lock as a replacement part for a damaged shell or as a retrofit part for an existing U-lock.

The protected U-lock and protective shackle shell of the invention provide an enhanced U-lock that has an extended ability to resist a destructive attack by a portable grinder. Simply put, the soft metal clogs up the cutting grit of the grinder wheel and substantially reduces the effectiveness of the blade against the hardened steel of the shackle, regardless of the shackle diameter. The enhanced diameter due to the shell generally exceeds that of most bolt cutters so even shackles of smaller diameter and corresponding lower weight can be provided with enhanced resistance to grinder attacks.

BRIEF DESCRIPTION OF THE DRAWINGS

FIG. 7 shows an exploded parts view of the U-lock according to the invention.

FIG. 8 depicts a shackle shell having internal, horizontal fins.

FIG. 9 depicts a shackle shell having internal, diagonal fins.

FIG. 10 depicts a shackle shell having internal, U-shaped fins.

DETAILED DESCRIPTION

Figure 1:
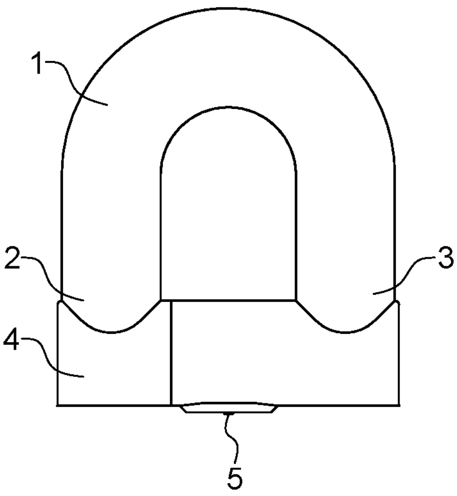
FIG. 1 shows an external front view of U-shaped lock having a shackle shell and a crossbar shell according to the invention.

A grinder resistant lock according to the invention starts with a U-lock having a hardened steel shackle and locking crossbar and then adds an outer shackle shell of a material that is softer than the hardened steel used in the shackle. The relatively soft metal of the shackle shell serves as a sacrificial element that melts under the frictional heat of the grinding operation and thereby clogs the cutting grit surfaces of the grinding blade. As the blade becomes clogged, it is less able to cut the relatively soft metal shell and less able to affect the hardened steel of the shackle.

The U-lock comprises a U-shaped shackle made of a hardened metal. It has first and second arms on either side of a centrally located curved portion thereby forming the shape of the letter U. The terminal end of each leg exhibits some form of engageable surface feature, which do not have to be the same type of surface feature, that allows the shackle to be engaged or disengaged by a lockable crossbar. For example, one terminal end may have an outward bend that extends laterally into the crossbar while the other terminal end exhibits a slot across the inner width of the shackle end forming a slotted locking foot at the ends of the first and second arms. A locking arm associated with the locking mechanism inside the crossbar then extends or retracts from engagement with this shackle slot and there by lock or unlock the crossbar. See U.S. Pat. No. 5,010,746.

Hardened steel is most commonly used for the shackle of a U-lock. There are, however, many levels of hardness and steel alloy formulations. The optimal hardness is generally considered to be within the range of 63-70 HRC with a weight of at least 2 kg and a diameter of at least 12 mm, and preferably within the range of 13-19 mm. (Many bolt cutters have a cutting edge hardness of about 61-62. Files and hack saws are 58-61 HRC)

The lockable crossbar is generally cylindrical in cross section and houses a locking mechanism made with a rotatable shaft that extends or withdraws locking arms from engagement with at least one of the shackle terminal end surface features.

The crossbar of the U-lock according to the present invention includes a hardened insert in the crossbar that is externally secured with countersunk screws. These screws are located on the upper side of the crossbar under the shackle shell and extend into the insert located within the crossbar. This location prevents the screws from being unscrewed when the shackle and shell are locked to the crossbar. This externally fastened insert is a way of protecting the hardened steel crossbar from attack by an angle grinder.

The shackle shell of the invention fits over and around substantially the entire length of the shackle that is not engaged or protected by the crossbar lock. Pointedly, the shell protects substantially the entire length of the shackle from the upper surface of the crossbar lock at the shackle's first terminal end to the portion above the crossbar at the shackle's second terminal end.

The shackle shell of the invention is made in substantial part, if not completely, from a material that is softer than the shackle steel but which is of a nature and thickness that is sufficient to clog a coarse grit cutting wheel and reduce its cutting efficiency when trying to cut the shall and shackle. Suitable materials include aluminum, aluminum alloys, aluminum-containing polymeric composites, and brass although aluminum and its alloys are preferred.

The shackle shell of the invention preferably exhibits one or more formed, internal discontinuities or void spaces that interfere with the efficient operation of the leading edge of the grinding blade during an attack.

Permanent mold casting is the preferred process to make the shackle shell. Die casting a cheaper and faster process for casting aluminum parts cannot be used for making the shackle shell because die cast parts are too porous to weld. Additionally, the alloys selected for consideration have a copper content less than 0.5%. It is essential that the copper content of the alloys is low in order for it to be welded in a commercially viable process. The main purpose of copper in aluminum alloys is to increase the alloys reactivity to heat treatment, however, increased copper also decreases weldability and reduces corrosion resistance. Table 1 below identifies some of the suitable aluminum alloys for use in the shackle shell of the invention. The values indicate maximum limits unless shown as a range or a minimum.

TABLE 1

| Chemical Composition Limits for Aluminum Alloys (Wt %) | | | | | | | | | | | |
|---|---|---|---|---|---|---|---|---|---|---|---|
| Alloy | Si | Fe | Cu | Mn | Mg | Cr | Zn | Ti | OTHERS EACH | OTHERS TOTAL | Al MiN. |
| 1070 | 0.20 | 0.25 | 0.04 | 0.03 | 0.03 | — | 0.04 | 0.03 | 0.03 | — | 99.70 |
| 1100 | 0.95 Si + Fe | | 0.05-0.20 | 0.05 | — | — | 0.10 | — | 0.05 | 0.15 | 99.00 |
| 3003 | 0.6 | 0.7 | 0.05-0.20 | 1.0-1.5 | — | — | 0.10 | — | 0.05 | 0.15 | Rem. |

TABLE 1-continued

| Chemical Composition Limits for Aluminum Alloys (Wt %) | | | | | | | | | | | |
|---|---|---|---|---|---|---|---|---|---|---|---|
| Alloy | Si | Fe | Cu | Mn | Mg | Cr | Zn | Ti | OTHERS EACH | OTHERS TOTAL | Al MiN. |
| 3004 | 0.30 | 0.7 | 0.25 | 1.0-1.5 | 0.8-1.3 | — | 0.25 | — | 0.05 | 0.15 | Rem. |
| 3005 | 0.6 | 0.7 | 0.30 | 1.0-1.5 | 0.20-0.6 | 0.10 | 0.25 | 0.10 | 0.05 | 0.15 | Rem. |
| 3104 | 0.6 | 0.8 | 0.05-0.25 | 0.8-1.4 | 0.8-1.3 | — | 0.25 | 0.10 | 0.05 | 0.15 | Rem. |
| 4004 | 9.0-10.5 | 0.8 | 0.25 | 0.10 | 1.0-2.0 | — | 0.20 | — | 0.05 | 0.15 | Rem. |
| 4104 | 9.0-10 5 | 0.8 | 0.25 | 0.10 | 1.0-2 0 | — | 0.20 | — | 0.05 | 0 15 | Rem. |
| 4043 | 4.5-6.0 | 0.8 | 0.30 | 0.05 | 0.05 | — | 0.10 | 0.20 | 0.05 | 0.15 | Rem. |
| 4045 | 9.0-11.0 | 0.8 | 0.30 | 0.05 | 0.05 | — | 0.10 | 0.20 | 0.05 | 0.15 | Rem. |
| 5005 | 0.30 | 0.7 | 0.20 | 0.20 | 0.50-1.1 | 0.10 | 0.25 | — | 0.05 | 0.15 | Rem. |
| 5050 | 0.40 | 0.7 | 0.20 | 0.10 | 1.1-1.8 | 0.10 | 0.25 | — | 0.05 | 0.15 | Rem. |
| 5052 | 0.25 | 0.40 | 0 10 | 0.10 | 2.2-2.8 | 0.15-0.35 | 0.10 | — | 0.05 | 0.15 | Rem. |
| 5252 | 0.08 | 0.10 | 0.10 | 0.10 | 2.2-2.8 | — | 0.05 | — | 0.03 | 0.10 | Rem. |
| 5056 | 0 30 | 0.40 | 0.10 | 0.05-0.20 | 4.5-5 6 | 0.05-0.20 | 0.10 | — | 0.05 | 0 15 | Rem. |
| 5657 | 0.08 | 0.10 | 0.10 | 0.03 | 0.6-1.0 | — | 0.05 | — | 0.02 | 0.05 | Rem. |
| 5182 | 0.20 | 0.35 | 0.15 | 0.20-0.50 | 4.0-5.0 | 0.10 | 0.25 | 0.10 | 0.05 | 0.15 | Rem. |
| 6061 | 0.40-0.8 | 0.7 | 0.15-0.40 | 0.15 | 0.8-1.2 | 0.04-0.35 | 0.25 | 0.15 | 0.05 | 0.15 | Rem. |

TABLE 2

| Hardness | | | | |
|---|---|---|---|---|
| Alloy | Temper | Tensile Strength (MPa) | Hardness Brinell HB | Hardness Vickers HV |
| AA1050A | H2 | 100 | 30 | 30 |
| | H4 | 115 | 35 | 36 |
| | H6 | 130 | 39 | |
| | H8 | 150 | 43 | 44 |
| | H9 | 180 | 48 | 51 |
| | 0 | 80 | 21 | 20 |
| AA2011 | T3 | 365 | 95 | 100 |
| | T4 | 350 | 90 | 95 |
| | T6 | 395 | 110 | 115 |
| | T8 | 420 | 115 | 120 |
| AA3103 | H2 | 135 | 40 | 40 |
| | H4 | 155 | 45 | 46 |
| | H6 | 175 | 50 | 50 |
| | H8 | 200 | 55 | 55 |
| | H9 | 240 | 65 | 70 |
| | 0 | 105 | 29 | 29 |
| AA5083 | H2 | 330 | 90 | 95 |
| | H4 | 360 | 100 | 105 |
| | H6 | 380 | 105 | 110 |
| | H8 | 400 | 110 | 115 |
| | H9 | 420 | 115 | 120 |
| | 0 | 300 | 70 | 75 |
| AA5251 | H2 | 210 | 60 | 65 |
| | H4 | 230 | 65 | 70 |
| | H6 | 255 | 70 | 75 |
| | H8 | 280 | 80 | 80 |
| | H9 | 310 | 90 | 90 |
| | 0 | 180 | 45 | 46 |
| AA5754 | H2 | 245 | 70 | 75 |
| | H4 | 270 | 75 | 80 |
| | H6 | 290 | 80 | 85 |
| | H8 | 315 | 90 | 90 |
| | H9 | 340 | 95 | 100 |
| | 0 | 215 | 55 | 55 |
| AA6063 | 0 | 100 | 25 | 85 |
| | T1 | 150 | 45 | 45 |
| | T4 | 160 | 50 | 50 |
| | T5 | 215 | 60 | 65 |
| | T6 | 245 | 75 | 80 |
| | T8 | 260 | 80 | 85 |
| AA6082 | 0 | 130 | 35 | 35 |
| | T1 | 260 | 70 | 75 |
| | T4 | 260 | 70 | 75 |
| | T5 | 325 | 90 | 95 |
| | T6 | 340 | 95 | 100 |
| AA6262 | T6 | 290 | | |
| | T9 | 360 | | |
| AA7075 | 0 | 225 | 60 | 65 |

TABLE 2-continued

| Hardness | | | | |
|---|---|---|---|---|
| Alloy | Temper | Tensile Strength (MPa) | Hardness Brinell HB | Hardness Vickers HV |
| | T6 | 570 | 150 | 160 |
| | T7 | 505 | 140 | 150 |

Preferred materials for the shackle shell are weldable aluminum alloys having a Knoop hardness of at least 50, and more preferably a Knoop hardness within the range of 70-140.

The most preferred aluminum alloys for the shackle shell include Aluminum A356.0-T6 (Rockwell B Hardness=49; Knoop Hardness=103), Aluminum A356.0-F (Knoop Hardness=78), Aluminum A357.0-F, Aluminum A357.0-T6 (Rockwell B Hardness=56; Knoop Hardness=114), and Aluminum 6061-T6 (Rockwell B Hardness=60; Knoop Hardness=120).

FIG. 1 is an external view of the protected lock of the invention with the U-shaped shackle shell 1 whose terminal ends 2, 3 are joined by a lockable crossbar 4 having a covered lock 5 on the bottom of crossbar 4. Lockable crossbar 4 may be made of hard metal or may be covered with its own soft metal shell around internal, lockably engageable, lock components.

Figure 2:
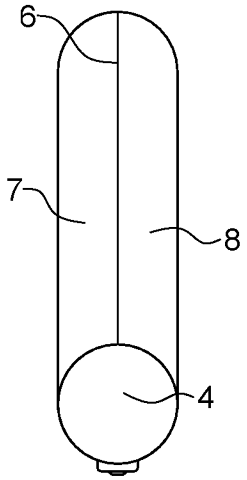
FIG. 2 is an external side view of U-shaped lock according to the invention.

FIG. 2 is a side view of the protected lock shown in FIG. 1. Weld 6 joins first shell 7 to second shell 8 in a permanent, preferably flush, connection.

Figure 3:
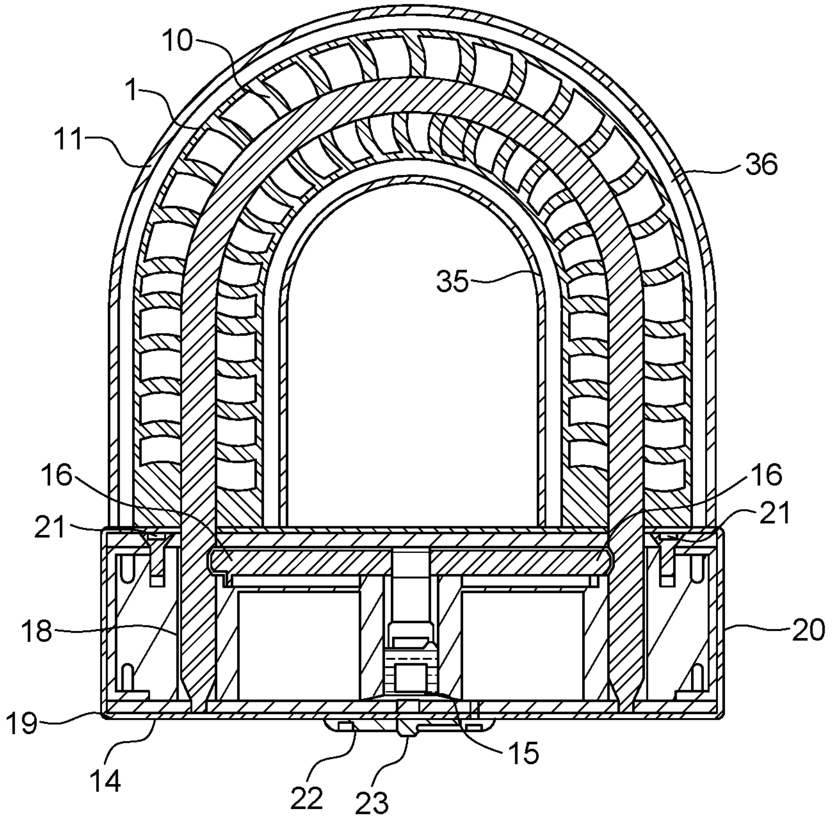
FIG. 3 presents a view of a U-shaped lock according to the invention with sectioned illustration of a U-shaped shackle shell installed and S-shaped internal fins.

FIG. 3 is a cross sectional view of a U-shaped lock 9 according to the invention. As shown, the U-shaped shackle 10 is covered by the U-shaped shackle shell 1 which is itself covered by a durable plastic or rubber outer cover 11 to avoid scratching of the finish on the locked bike. S-shaped fins 12 between adjacent fin openings 13 are formed along the interior of the shackle shell. These internal discontinuity structures interfere with an angle grinder disk as it attempts to grind its way through shell 1 on its way to shackle 10.

Lockable crossbar 14 is made with lock core 15 that engages internal locking bar sections 16. Each locking bar section 16 is configured to engage a slot or groove 17 in each terminal end 18 of shackle 10 when shackle 10 is inserted into crossbar 14. Lock core 15 is generally between a crossbar left shell end cap 19 and crossbar right shell end cap 20 that are joined together within crossbar 14 and secured in position with flush retaining screws 21.

Figure 4:
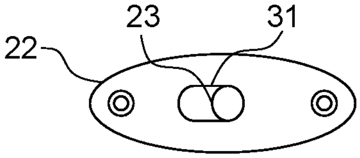
FIGS. 4 and 5 show external and internal views, respectively, of the keyhole cover and slider on the bottom of the crossbar.
Figure 5:
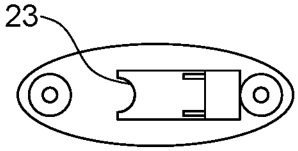

A keyhole cover 22 and slider 23 are movable for a short distance to cover the keyhole of the locking core for protection against water, dirt, grit, etc. See FIGS. 4 and 5. As shown, the keyhole slider can be moved between a first covering position and a second open position that allows access to the lock core within the crossbar.

Figure 6:
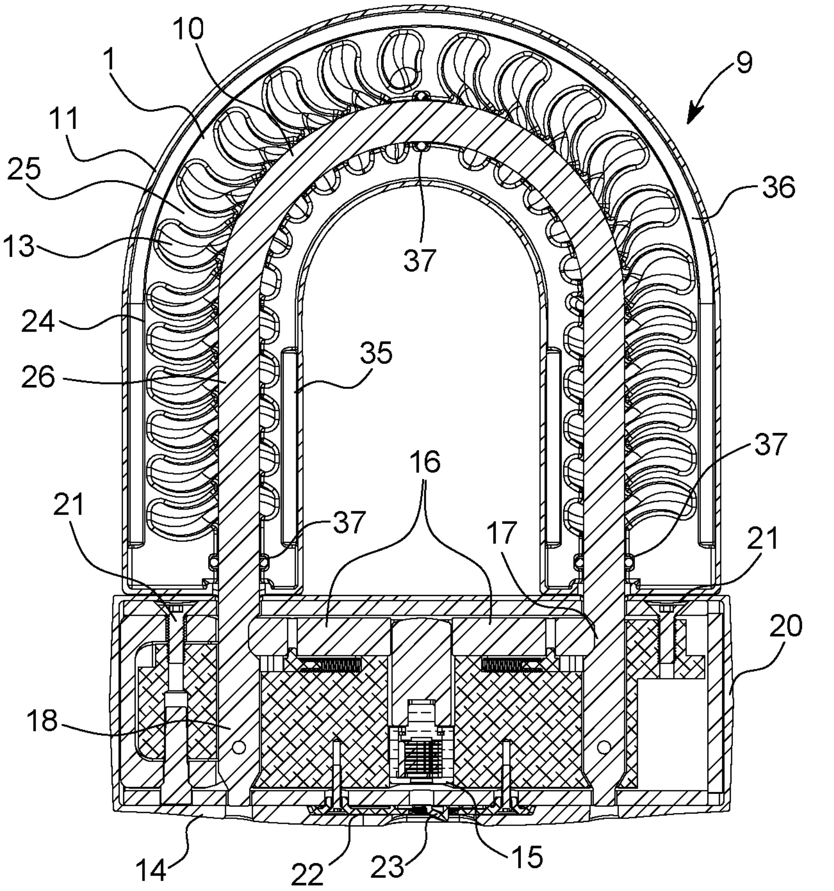
FIG. 6 is a cross sectional view of a U-shaped lock having an elliptical shackle shell according to the invention.

FIG. 6 illustrates a cross sectional view of an embodiment with elliptical shackle shell 24, internal S-shaped fins 25, and shackle groove 26 for shackle 10. The internal details are the same or very similar to those shown in FIG. 3. The exterior depth of elliptical shell 24 are desirably of a thickness that the transverse distance through shell 24 is preferably greater than about 2.5 inches (6.35 cm) to make the distance too far for a typical, battery-powered, angle grinder blade to reach shackle 10. Such blades are typically about 4 inches 10 cm) in diameter. The distance between the legs of the shackle shell 24 are also desirably too short to fit a typical angle grinder head connected to a blade. Such sizing enhances the resistance of the present lock to attacks by angle grinders.

O-rings 37 around shackle 10 are helpful to block contaminants from access to shackle 10 and to solidly position shackle 10 in groove 26.

FIG. 7 shows an exploded parts view of the U-lock according to the invention. U-shaped shackle 10 is covered by a pair of shackle shells 1 that are welded around shackle 10. The lockable crossbar 14 is shown as having lock core 15 with locking bar 16. These elements are within crossbar insert 27 within crossbar outer body 28 that is sealed on either end with a first end cap 29 and second end cap 30. Retaining screws 21 secure crossbar insert 27 inside crossbar outer body 28. Access to lock core 15 is selectively closable by moving keyhole slide 23 over opening 31 in keyhole cover 22. In its closed position, slide 23 protects lock core 15 from exposure to water, dirt, and materials that might clog or foul lock core 15.

As shown in FIGS. 3 and 6, shackle shell 1 preferably has a series of S-shaped fins 12 formed into the interior of each shell when formed, preferably by casting. It is within the scope of the invention, however, that shackle shell 1 would use straight fins that extend away from the shackle groove, e.g., horizontal fins 32 that extend substantially perpendicular to shackle groove 26 (FIG. 8) or diagonally extending fins 33 that are at a non-perpendicular, non-parallel angle (e.g., an angle within the range of 1°-45°) relative to shackle groove 26 (FIG. 9). It is also within the scope of the invention to form nonlinear fins inside shackle shell 1, such as the S-shaped fins 12 discussed above or U-shaped fins 34 as shown in FIG. 10. Each of these fin shapes are formed during the casting process of shell 1 by forming voids within each shell 1. These voids form the desired fins therebetween and act as a discontinuity that interferes with efficient angle grinding thereby enhancing the security of the shell-protected shackle.

Preferably, shackle shell 1 is formed by welding together two complementary shell halves. To this end, it is desirable to provide each shell section with a chamfer 35, 36 on the inside and the outside edges, respectively, of the U-shaped shell section. The width and depth of the chamfer is preferably of sufficient depth and width to allow the weld to be ground substantially flat and flush with the exterior of the joined shells.

EXAMPLES

Example 1

Because the main goal of this lock is to be angle grinder resistant, our first test entailed cutting sample sections with an angle grinder. We prepared a test specimen using a pair of solid shell sections welded in position around a hardened steel rod that became secured in a central channel formed in each section. A series or probe holes drilled into the shell allowed us to measure the temperature of the rod during the welding process and as the shell was attacked by an angle grinder.

The welding test yielded encouraging results. We welded small rectangular test blocks to control as many variables as possible in addition to cylindrical sections similar to those that will be found on the product. With the various fillet sizes in the rectangular blocks, we were able to create multiple acceptable welds. This shows that the fillet design is not only feasible, but also readily modifiable to achieve various weld profiles. In addition to welding 6061 sample blocks, we also welded A356, a casting-specific alloy. The casting alloy produced even better results than the 6061, leading us to reason that the welding of a cast aluminum part is entirely possible.

As the two controlled sections of the tests show, pulse MIG welding is an entirely viable manufacturing process. Using a grounding process involving a copper strap and a bolt yielded excellent results and the v-blocks used to fixture the half-cylindrical sections while we welded worked equally well.

As the more important section of the test, some specific parameters were established prior to testing. We wanted to test how quickly each design could be plunge cut to the depth of the shackle and how quickly an angle grinder could cut through the section entirely. For the purposes of consistency, we called the latter a “360 cut” because we would need to cut from all sides of the test section. If a 4.5" diameter cutting wheel is loaded into the grinder, hypothetically a maximum cutting depth of 2.25" can be obtained. However, the housing on the transmission of the angle grinder limits the cut to approximately 1.5" or less when the cutting wheel is new. As the wheel is an abrasive cutting wheel, the diameter of the wheel decreases as the cut progresses. We observed decreases of almost 0.2" in diameter while cutting the test section during our cut around the shackle. Our plunge cut tests proved successful, primarily due to equipment failure.

The severe load involved with cutting through a 3" diameter piece of aluminum took its toll on the battery. Approximately every 4 minutes, the battery needed to be removed to cool and recharge. The first plunge cut on the S2 section required two batteries, the first died at 3:44 (hours: minutes) and the second took us to the end of the cut at 5:38. The second plunge cut test was completed in 2:12 with one battery.

The 360° test exacerbated the rate of battery drain. We needed three different batteries and approximately 12 minutes with a 4.5 inch wheel to remove the aluminum and reach the steel shackle. At this point, we had also noticed enough of a diameter decrease in the cutting wheel to be unable to reach the steel shackle inside the aluminum.

We also noticed approximately a 50° F. increase in the temperature of the shell material. The results of this test, however, are encouraging for two reasons. Instead of being able to make a simple plunge cut from one side as is possible on every other available lock on the market, a thief must be able to cut from all sides. While this in itself is extremely challenging due to the presence of a bike and a street sign or bike rack, a thief must also come prepared with extra batteries (six, three amp-hour batteries, if they choose the same tool we did) and extra cutting discs. The relatively low temperature rise of the shell material is also not sufficient to affect the hardness of the steel in the shackle.

A plunge cut test took us 2:12 in the S5 section. We cut approximately 180 degrees. For the S2 section, the cut took 3:44 until the first battery died and 5:38 until the second battery died. While the S2 section offers significantly more cut resistance, the S5 section did not lack in cutting difficulty.

The 360° cut on S5 took even longer. The first battery lasted until 3:55 and approximately 180 degrees. We refrigerated the battery after recharging in an attempt to hold off the overheating issue. This next battery lasted until 8:00 and was able to reach most of the way around. After another recharging and cooling cycle, we noticed the two ends of the cut did not line up perfectly. As the kerf left by the cutting wheel is only a few millimeters thick, any slight error in angle results in the ends of the cut being misaligned as shown by the lower red arrow. We used the next battery to clean up the cut and try and sever the remaining material, but we were unable to fully cut through the aluminum due to the worn down disc not being able to reach far enough past the gears of the grinder. The battery died at 12:00.

Example 2

The next phase of testing for the development of an angle grinder resistant lock was to test a shackle shell having an elliptical, cross section, shape The elliptical cross section shape places the shackle on the inside of the shackle shell thereby placing the majority of the aluminum shackle shell material on the outside of the shackle. This allows for the overall weight of the lock to be reduced from approximately 15 lbs to about 10 lbs. The theory behind this design is that the angle grinder will not be able to cut the shackle on the inside of the U-lock because the gap in the U is smaller than the diameter of the angle grinder disc.

Previously the main concern with the feasibility of this design was the heat from welding this part being so high that it would reduce the hardness of the hardened steel. After seeing how the welding of the previous test sections had no effect on the hardness of the steel, the elliptical shackle shell shape should be feasible. Similarly after seeing how the 4.5" angle grinder failed to cut the round shackle shell design there is optimism that the elliptical shackle shell design will work.

FIG. 10 is a sectional view of the elliptical test section with S-curve internal fin design. The holes in the test section can be used to insert a thermocouple to monitor temperature during welding. They would not otherwise be used in a commercial product.

FIG. 11 shows how the welded elliptical shackle shell sections are installed to test if an angle grinder can cut the inner surface of a U-lock design when the grinding disc is bigger than the gap between the covered shackle legs.

The disclosures of all patents cited herein are hereby incorporated by reference.

The invention claimed is:

1. A grinder resistant lock according to the invention includes:

(a) a U-lock comprising (i) a U-shaped shackle made of a hardened metal and exhibiting first and second arms on either side of a centrally located curved portion having a radially inner side and a radially outer side, and (ii) a lockable crossbar that releasably engages a terminal end on each of the shackle first and second arms; and (b) a shackle shell that fits over and around substantially the entire length of the shackle, wherein said shackle shell is made from a material having a Knoop Hardness within a range from about 50 to about 140 that is relatively softer than the shackle and sufficiently thick to clog a coarse grit cutting wheel when contacting said shell and thereby reducing the cutting efficiency of the cutting wheel, wherein said shackle shell is in the form of two, joinable, U-shaped half shell sections each having an inner surface located adjacent the arms of said shackle and an outer surface located outside the arms of said shackle and spaced apart from said inner surface by a shell thickness, each half of said shackle shell having a plurality of spaced apart, internal fins that extend between said inner surface and said outer surface thereby forming internal void spaces within said shell thickness.

2. A grinder resistant lock according to claim 1 wherein said shackle shell comprises aluminum or an aluminum alloy.

3. A grinder resistant lock as in claim 1 wherein two half shell sections have been welded together around the shackle.

4. A grinder resistant lock as in claim 1 wherein two half shell sections have been secured together around the shackle with fasteners.

5. A grinder resistant lock as in claim 1 wherein two half shell sections have been secured together around the shackle with a high impact adhesive.

6. A grinder resistant lock as in claim 1 wherein the internal fins extend radially away from said internal surface within said shell thickness.

7. A grinder resistant lock as in claim 6 wherein said fins extend in a radially straight direction between said internal surface and said outer surface.

8. A grinder resistant lock as in claim 6 wherein said fins extend radially and diagonally between said internal surface.

9. A grinder resistant lock as in claim 6 wherein said fins exhibit an S-shape between said internal surface and said outer surface.

10. A grinder resistant lock as in claim 6 wherein said fins exhibit a U-shape between said internal surface and said outer surface.

11. A grinder resistant lock according to claim 1 wherein said lockable crossbar further comprises a crossbar shell that extends over and around substantially the entire length of the lockable crossbar.

12. A grinder resistant lock according to claim 1 wherein said shackle shell has an exterior thickness of greater than about 2.5 inches.

13. A protective, U-shaped, shackle shell configured to fit over and around substantially the entire length of a U-lock shackle and being made from a metal that is softer than hardened steel, wherein said shackle shell is sufficiently thick to clog a grinder wheel contacting said shell and thereby reduce the cutting efficiency of the grinder wheel, wherein said shackle shell fits over and around substantially the entire length of said shackle, wherein said shackle shell is made from a material having a Knoop Hardness within a range from about 50 to about 140 that is softer than the shackle, wherein said shackle shell is in the form of two, joinable, U-shaped half shell sections each having an inner surface located adjacent the arms of said shackle and an outer surface located outside the arms of said shackle and spaced apart from said inner surface by a shell thickness distance, each half of said shackle shell having a plurality of spaced apart, internal fins that extend between said inner surface and said outer surface, wherein said fins form internal void spaces within said shell thickness between the inner and outer surfaces.

14. A shackle shell according to claim 13 wherein said shackle shell comprises aluminum or an aluminum alloy.

15. A shackle shell according to claim 13 having an exterior thickness of greater than about 2.5 inches.

* * * * *